Sept. 17, 1935.  A. L. MUNK  2,014,976
MOISTURE AND DECORATIVE RECEPTACLE
Filed Sept. 5, 1934
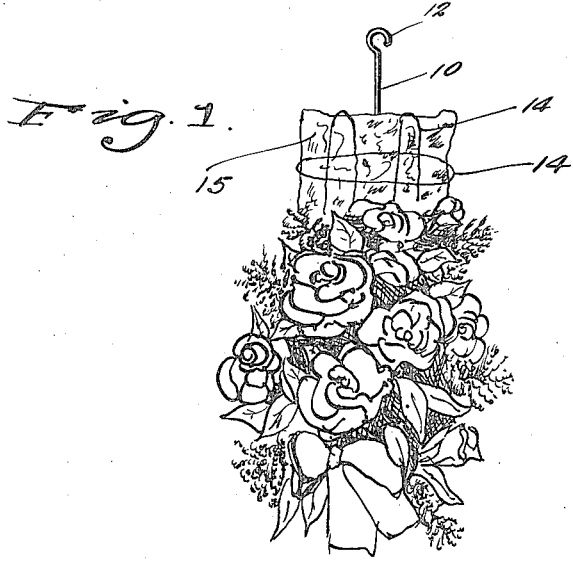
Fig. 1.
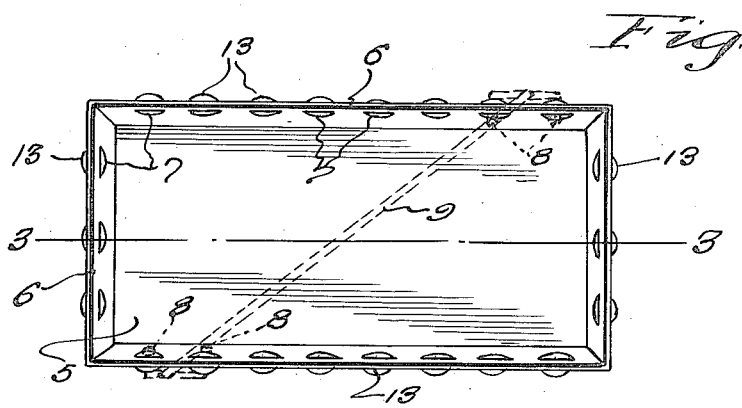
Fig. 2.
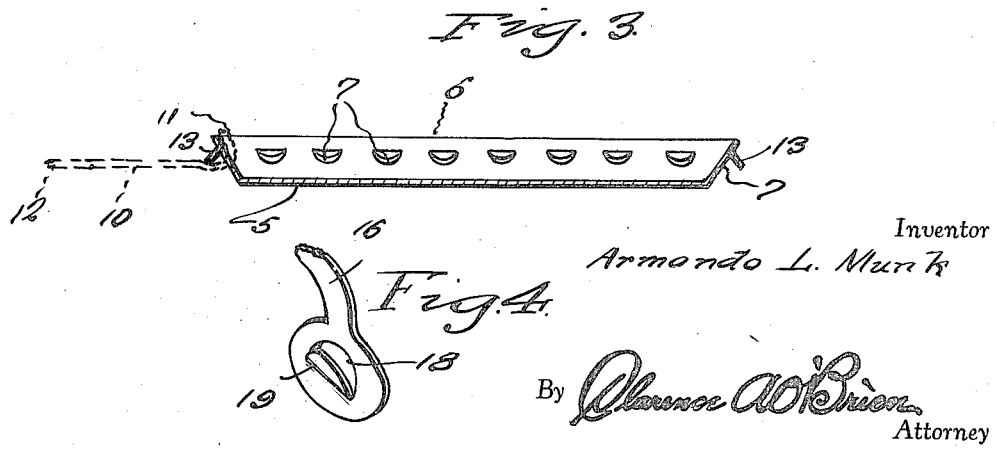
Fig. 3.
Fig. 4.
Inventor
Armando L. Munk
By Clarence A. O'Brien
Attorney Patented Sept. 17, 1935

2,014,976

UNITED STATES PATENT OFFICE 2,014,976

MOISTURE AND DECORATIVE RECEPTACLE

Armondo L. Munk, Zanesville, Ohio

Application September 5, 1934, Serial No. 742,818

6 Claims. (Cl. 47—41)

My invention relates in general to an improvement in floral receptacles, and in particular to an improvement in floral receptacles which are adapted to contain moisture-holding material for the insertion therein of the stems of flowers for the construction of floral pieces and sprays.

It is well known that floral sprays are constructed by placing moss in a receptacle and by inserting the stems of the flowers forming the spray, into the moss, which, because of its moisture-holding qualities, will preserve the flowers for a considerable time.

The principal object of my invention is to provide means whereby the moss may be easily secured in the floral receptacle.

Another object of my invention is to provide means whereby the floral spray may be suspended at an angle best suited to give the artistic effect desired.

A further object of my invention is to permit the floral spray to be handled at any convenient point on the receptacle, when it is desired to move the receptacle from place to place.

Other objects of my invention will be apparent from the following description of the present preferred form thereof, taken in connection with the accompanying drawing, wherein:

Figure 1 is a view of the floral spray in a suspended vertical position, and showing the manner of securing the moisture-holding material to the receptacle.

Figure 2 is a top plan view of the floral receptacle, having a handle attached thereto.

Figure 3 is a cross sectional view of the floral receptacle taken on the line 3—3 of Figure 2, the receptacle having a handle attached thereto.

Figure 4 is a fragmentary view of a modified form of handle used to carry or suspend the receptacle.

In the drawing, wherein for the purpose of illustration, is shown a preferred embodiment of my invention, 5 designates a receptacle made of metal or other materials. This receptacle, as shown in the accompanying drawing, is rectangular in configuration; however, it may be of any desired shape according to the artistic design to be effected by the floral spray.

The sides 6 of the receptacle 5 have formed therein near their upper edges a series of perforations 7, which are adapted to receive the prong ends 8 of a handle 9. It is evident that by having a series of perforations in the sides of the receptacle, the handle 9 may be varied in position relative to the receptacle, thereby permitting the receptacle to be suspended at various angles.

When the receptacle 5 is to be suspended in a vertical position, the eye hook handle 10 is used. This handle has both of its ends terminating in hooks, one of which 11 is inserted in one of the perforations 7, as clearly shown in Figure 3, and the other of which 12 is adapted to be attached to the wall or ceiling in a suitable manner.

The perforations 7 are preferably stamped out of the sides 6 of the receptacle 5 to form projections 13, which anchor the cord, wire, or other suitable lacings 14 in place to retain the moisture-holding material 15 in position in the receptacle. While these projections 13 are formed by stamping out the perforations 7, they may, however, be formed by riveting, welding or by any other method of securing them to the sides of the receptacle.

Figure 4 shows a modified form of handle 16 that may be used to hold the receptacle in suspended or carrying position. Each end 17 has perforations 18 similar to those of the receptacle 5, and the consequent projections or hooks 19 which are adapted to accommodate any one of the projections 8 of the receptacle. Thus, the handle can be detachably engaged to any side at any angle across the receptacle, containing the floral spray.

In use, moss or other moisture-holding material 15 is placed in the receptacle 5. In order to retain the moss in place, cord, wire or other suitable material is laced across the moss, and anchored in position to the projections 13. Stems of flowers are then inserted in the moss, thereby forming the floral spray. To permit the carrying and the suspension of the floral spray, handles are provided which are adapted to fit any of the series of perforations 7 or any of the series of projections 13, depending on the type of handle used. Thus the handle may be attached to the receptacle at any point to permit the floral spray to be carried or suspended at any desired angle.

Various changes may be made in my invention, especially in details of construction, proportions and arrangement of parts, within the scope of the appended claims.

What is claimed is:

1. A device of the character described comprising a receptacle having sides, said sides having perforations stamped out of the same to form projections, and a handle having perforations stamped out of both ends thereof to form hooks, adapted to selectively engage said projections.

2. A device of the character described comprising a receptacle having sides for containing moisture-holding materials, said sides having perforations stamped out thereof to form projections, means engageable with the projections to secure the material in the receptacle, and a detachable handle having hooked ends to selectively engage the sides of the receptacle and to support the same.

3. A device of the class described comprising a receptacle having sides for containing moisture-holding material, said sides having perforations stamped out thereof to form projections, means engageable with said projections to lace the material to the receptacle, and a handle having prong ends to selectively engage groups of said perforations.

4. A device of the character described comprising a receptacle having sides for containing moisture-holding material, said sides having a series of perforations stamped out thereof to form projections, means engageable with said projections to lace the material to the receptacle, and a detachable handle having its ends bent to form hooks, one end being selectively engageable with one of said perforations and the other end engageable with a support to permit the suspension of the receptacle in a vertical position.

5. In combination, a flower receptacle having sides, said sides having perforations stamped out thereof to form projections, a detachable handle with hooked ends to selectively engage the sides of the receptacle, moisture-holding material adapted to be placed in the receptacle and adapted to support flowers, and means engageable with the projections to lace the material in place in the receptacle.

6. A handle for a flower receptacle with sides provided with projections, said handle having its ends struck out to form hooks, adapted to selectively engage said projections.

ARMONDO L. MUNK.